3 Sheets--Sheet 1.

J. URBAN.
Combined Plows, Planters, and Cultivators.
No. 147,882. Patented Feb. 24, 1874.

Witnesses:
Chas. Nida
Alex F. Roberts

Inventor:
J. Urban
Per
Attorneys.

AM. PHOTO-LITHOGRAPHIC Co. N.Y. (OSBORNE'S PROCESS.)

3 Sheets--Sheet 2.
J. URBAN.
Combined Plows, Planters, and Cultivators.
No.147,882. Patented Feb. 24, 1874.
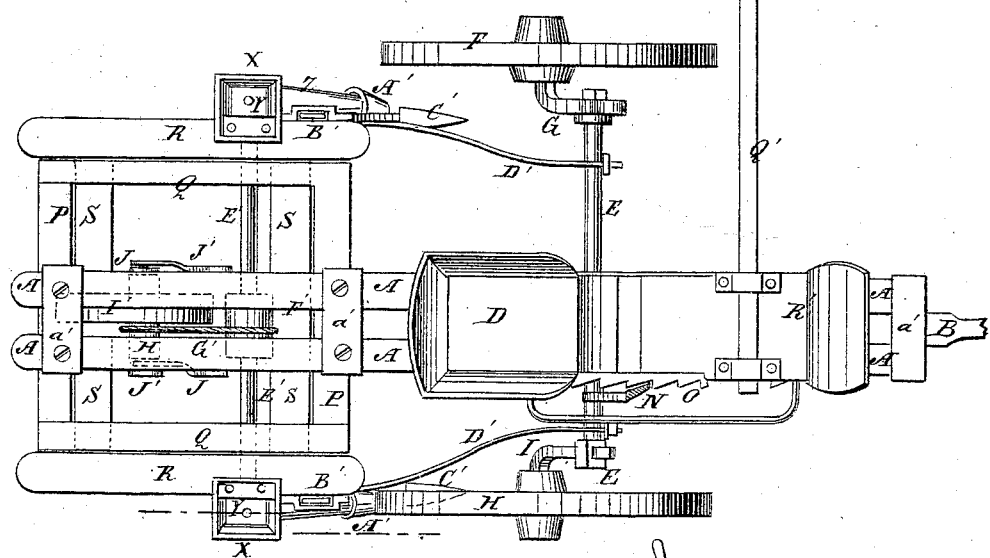
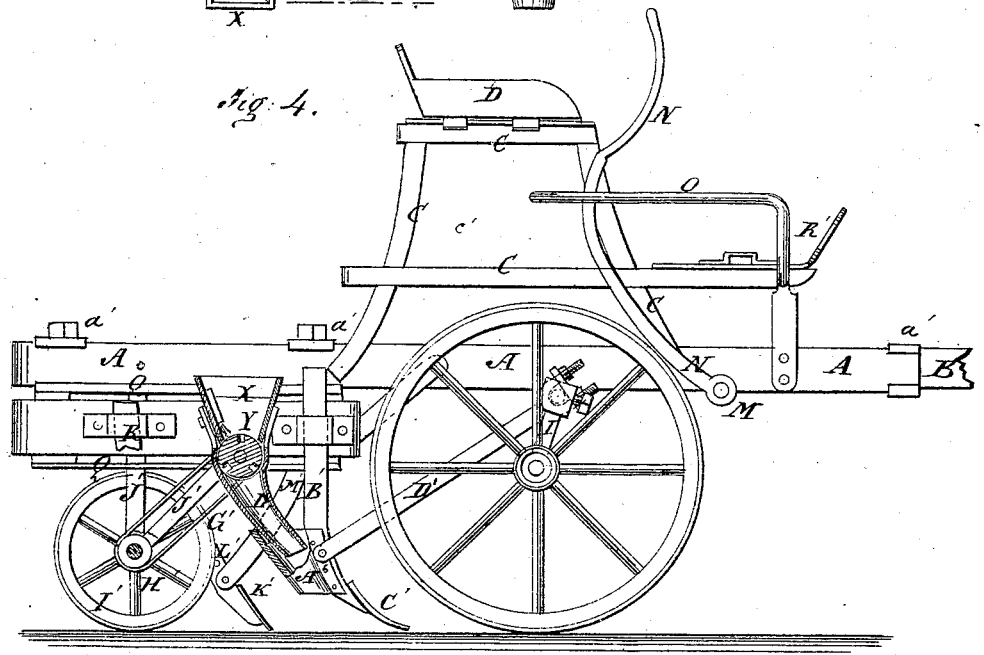
Witnesses: Chas. Nida
Alex F. Roberts
Inventor: J. Urban
Per Munn & Co.
Attorneys.

3 Sheets--Sheet 3.
J. URBAN.
Combined Plows, Planters, and Cultivators.
No. 147,882. Patented Feb. 24, 1874.
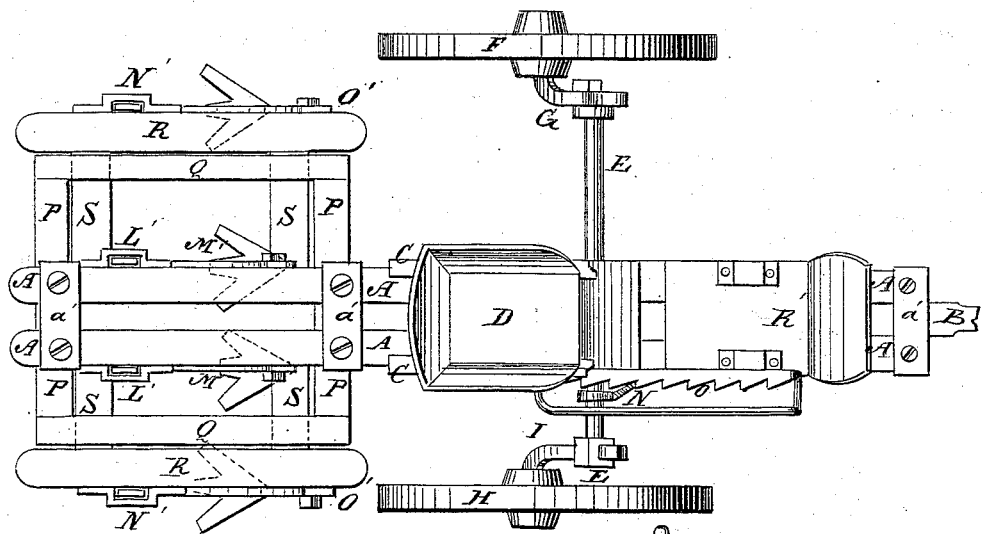
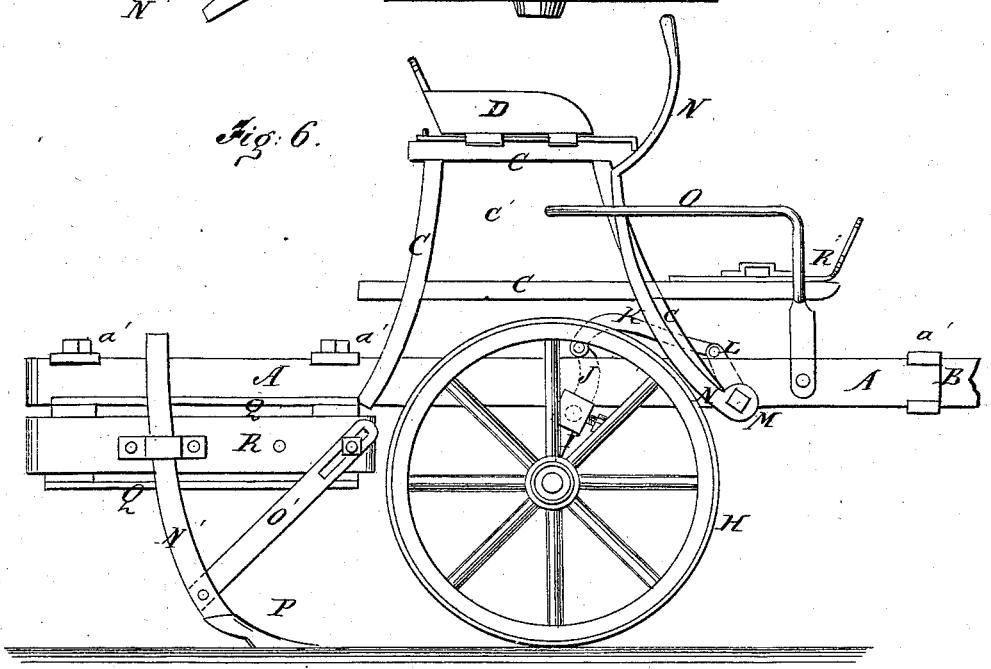
Witnesses:
Chas. Nida
Alex F. Roberts
Inventor:
J. Urban
Per Mmmf
Attorneys.

UNITED STATES PATENT OFFICE

JOHN URBAN, OF BELTON, TEXAS.

IMPROVEMENT IN COMBINED PLOWS, PLANTERS, AND CULTIVATORS.

Specification forming part of Letters Patent No. 147,882, dated February 24, 1874; application filed September 20, 1873.

*To all whom it may concern:*

Figure 1:
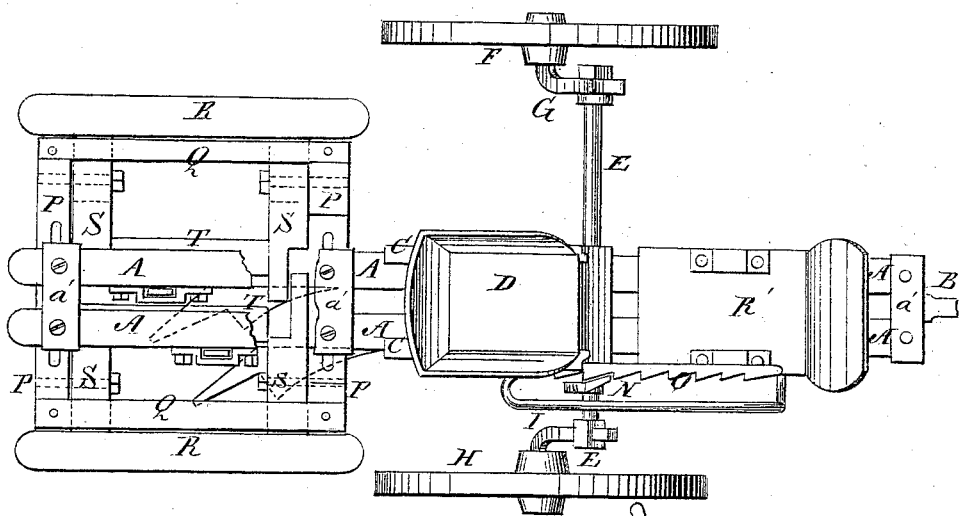
Figure 2:
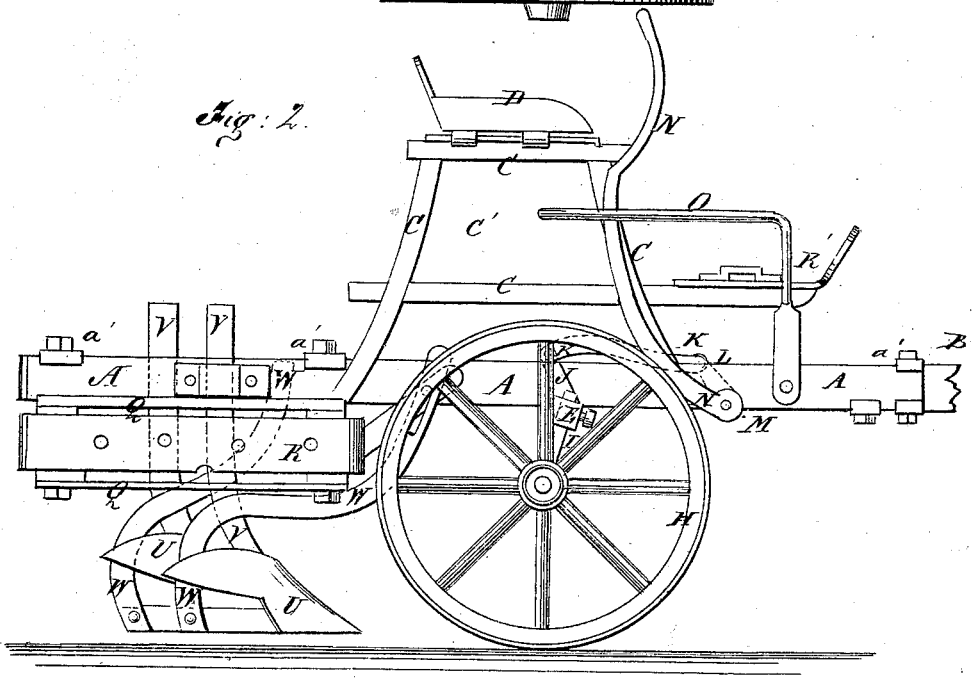

Be it known that I, JOHN URBAN, of Belton, in the county of Bell and State of Texas, have invented a new and Improved Combined Plow, Planter, and Cultivator, of which the following is a specification:

Figure 1, Sheet 1, is a top view of my improved machine arranged as a plow, part being broken away to show the construction. Fig. 2, Sheet 1, is a side view of the same. Fig. 3, Sheet 2, is a top view of my improved machine arranged as a planter. Fig. 4, Sheet 2, is a side view of the same, partly in section, through the line $x\ x$, Fig. 3. Fig. 5, Sheet 3, is a top view of my improved machine arranged as a cultivator. Fig. 6, Sheet 3, is a side view of the same.

Similar letters of reference indicate corresponding parts.

The invention will first be fully described, and then pointed out in the claim.

A A are two parallel beams, which are connected and held at the proper distance apart by straps or bars, $a'$, bolted to them. B is the tongue, which is pivoted to and between the forward ends of the beams A. To the beams A is attached a frame, C, upon the top bars of which the driver's seat D slides forward and back, so that the driver, by adjusting his seat, can bring his weight over or in the rear of the axle E, as may be desired. Within the frame C is formed a box, $c'$, for carrying any small article the driver may wish. E is the axle, which works in bearings attached to the lower side of the beams A, a little in front of their centers. F is the land-wheel, which revolves upon the journal of the crank G, in the inner arm of which, near its end, are formed two holes, to receive the end of the axle E. J is an arm placed between the beams A, and having a hole formed through it to receive the axle E, to which it is adjustably secured by a key and groove. To the upper end of the arm J is pivoted the rear end of the connection-bar K, the forward end of which is pivoted to the end of the arm L, attached to the short shaft M, which works in bearings attached to the beams A. To one end of the short shaft M is attached the lower end of a lever, N, which projects upward into such a position as to be readily reached and operated by the driver from his seat to raise the plows from the ground. The lever N moves along a toothed rack, O, the teeth of which hold the said lever securely in any position into which it may be moved. To the rear part of the beams A are bolted two cross-beams, P, the said bolts passing through holes in the beams A, and through longitudinal slots in said cross-beams P, enabling them to be adjusted as required. The cross-beams P are connected by bars Q, attached to the upper and lower side of their ends. R are two side beams, to the inner sides of which, near their ends, are attached arms S, which slide along the inner sides of the cross-beams P, and are secured to said cross-beams by bolts which pass through holes through the cross-beams P, and through slots in the arms S. The inner ends of the arms S are halved, so that they may overlap each other, and are connected by bars T, attached to them near their inner ends. This enables the side beams R to be adjusted wider apart or closer together. U are the plows, the standards V of which pass through keepers attached to the beams A, and are secured in place by wedge-keys or other convenient means. X are the seed-hoppers, which are secured to the side beams R, and the lower ends of which fit upon the recessed dropping-cylinders Y, by which the seed is removed from the hoppers X and deposited in the conductor-spouts Z, the lower ends of which enter and work in the short spouts A', attached to the rear lower part of the standards B', to guide the seed into the furrows opened by the plows C', attached to said standards B'. The draft-strain upon the standards B' is sustained by the braces D', the forward ends of which are attached to the axle E. The dropping-cylinders Y are attached to the shaft E', which revolves in bearings attached to the lower sides of the side beams R and bars T. To the middle part of the shaft E' is attached a pulley, F', around which passes a band, G', which also passes around a pulley, H', formed upon or attached to the hub of the wheel I', the journals of which revolve in brackets J', attached to the beams A, so that the seed may be dropped by the advance of the machine. The seed is covered by the covering-plows K', the standards L' and braces M' of which are secured to the side beams R.

When the machine is to be used as a cultivator, the covering-plows K′ L′ M′ are detached from the side beams R and attached to the opposite sides of the beams A, and to the outer sides of the side beams R are attached the standards N′ and the braces O′ of the plows P′. The plows P′ may be shovels or any other suitable kind of plow. Q′ is a bar inserted in keepers attached to the foot-board R′ of the driver's seat D, and which is designed to have a drag connected with its outer end to mark the ground, to serve as a guide in keeping the rows parallel.

Having thus described my invention, I claim as new and desire to secure by Letters Patent—

The combination, with the two parallel beams A A, of the adjustable cross-beams P and the side beams R S, adjustable in the beams P, as described, to form a frame adapted to be used with a planter, plows, or cultivators.

JOHN URBAN.

Witnesses:
W. S. RATHER,
R. H. TAYLOR.